PACKAGING MACHINE AND METHOD

Original Filed Feb. 15, 1962 3 Sheets-Sheet 1

INVENTORS
HERMOND G. GENTRY
BRUCE GARRARD
BY Walter M. Rodgers
ATTORNEY

PACKAGING MACHINE AND METHOD

Original Filed Feb. 15, 1962 3 Sheets-Sheet 2

INVENTORS
HERMOND G. GENTRY
BRUCE GARRARD
BY Walter M. Rodgers
ATTORNEY

PACKAGING MACHINE AND METHOD

Original Filed Feb. 15, 1962 3 Sheets-Sheet 3

INVENTORS
HERMOND G. GENTRY
BRUCE GARRARD
BY Walter M. Rodgers
ATTORNEY

United States Patent Office

Re. 26,851
Reissued Apr. 7, 1970

26,851
PACKAGING MACHINE AND METHOD

Hermond G. Gentry and Bruce Garrard, Atlanta, Ga., assignors to The Mead Corporation, a corporation of Ohio Original No. 3,127,720, dated Apr. 7, 1964, Ser. No. 173,581, Feb. 15, 1962. Application for reissue Mar. 29, 1966, Ser. No. 541,056
Int. Cl. B65b *11/48*
U.S. Cl. 53—32 15 Claims

Matter enclosed in heavy brackets [ ] appears in the original patent but forms no part of this reissue specification; matter printed in italics indicates the additions made by reissue.

This invention relates to a packaging machine and method and more particularly to a high speed machine for applying a wrap-around type carton to a group of similarly shaped articles to be packaged, and more particularly to a machine of this type which is especially adapted to apply a wrap-around carton having an end panel disposed at the ends of the carton and serving to provide billboard advertising space as well as to aid in holding the articles within the package group.

Articles packaged with wrap-around type cartons are commonly displayed in merchandising outlets such as retail supermarkets. Where the wrapper is of the open end type and where the packages are disposed with their ends exposed to view, it may be difficult for the shopper to identify the particular brand of goods displayed.

Where wrap-around type blanks are used in conjunction with bottled goods as distinguished from canned goods or where the packages are not characterized by substantial mechanical strength, it may be difficult to form a secure and tight package using a wrap-around type of packaging blank because of the fragile nature of the primary packages.

A principal object of the invention is to provide an improved machine and method for use in conjunction with a wrap-around type of package having an end panel disposed at each end thereof.

Another object of the invention is the provision of an improved high speed packaging machine and method which are inherently capable of forming a secure and sturdy package and which are largely independent of the mechanical strength of the primary packages.

The invention in one form as applied to a high speed packaging machine is for the purpose of adapting such a machine to a wrap-around wrapper blank having an end panel at its ends and comprises an endless tucking conveyor having a tucking reach which is disposed in converging relation to the path of movement of the groups of articles to be packaged and their associated wrappers. According to a feature of the invention a tucking stud is mounted on the tucking conveyor and is engageable with a tucker panel on the wrapper adjacent the leading one of the end panels of the carrier and a tucking pawl is also mounted on the tucking conveyor and is arranged to engage a tucker panel on the wrapper near the trailing end panel of the carrier. Suitable guides are provided to continue the folding operations initiated by the tucking stud and the tucking pawl which in turn tend to set up the wrapper type carton with the end panels disposed vertically.

Figure 1:
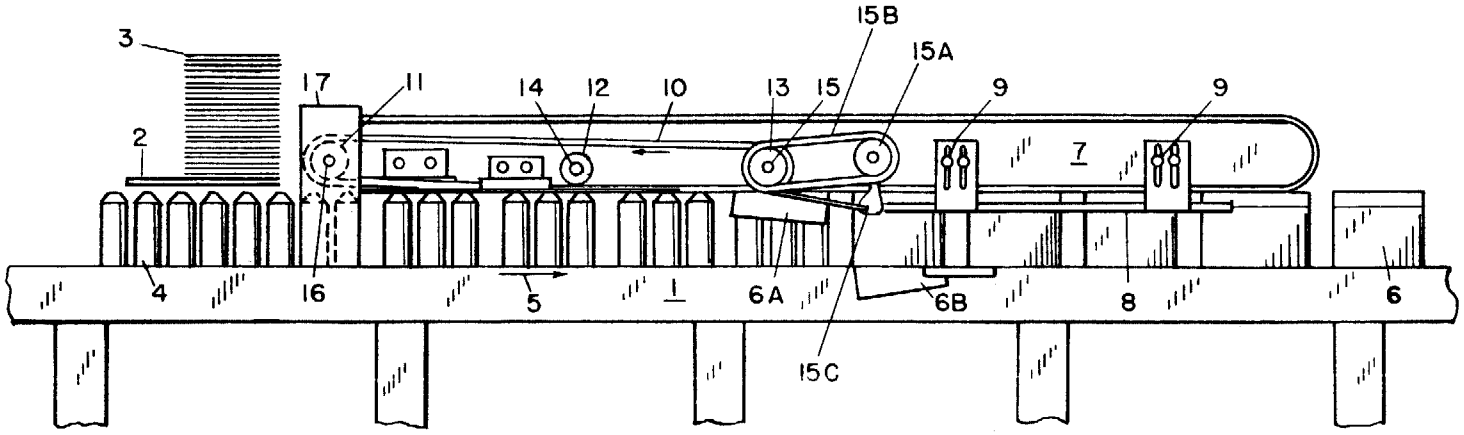
Figure 4:
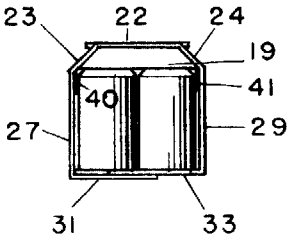
Figure 3:
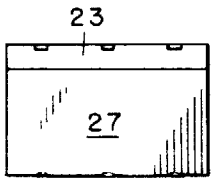
Figure 2:
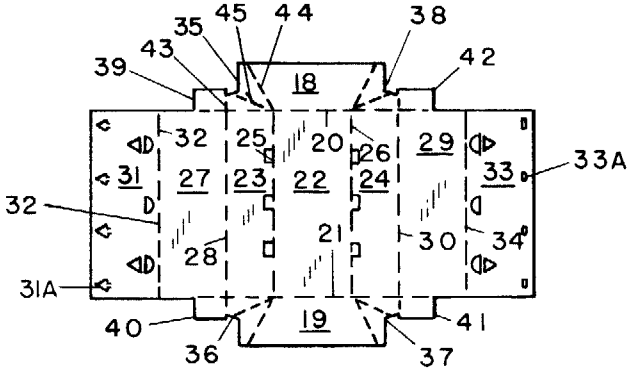
Figure 5:
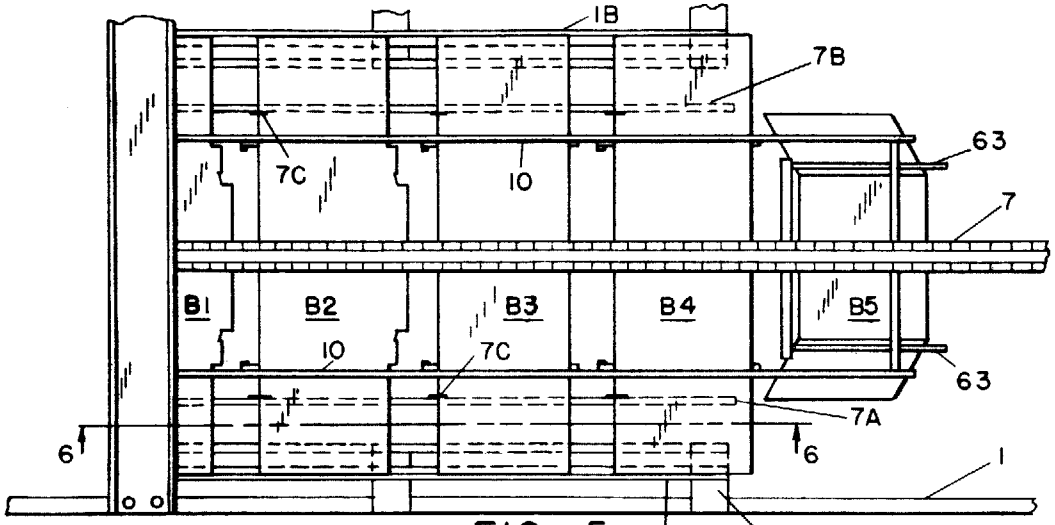
Figure 6:
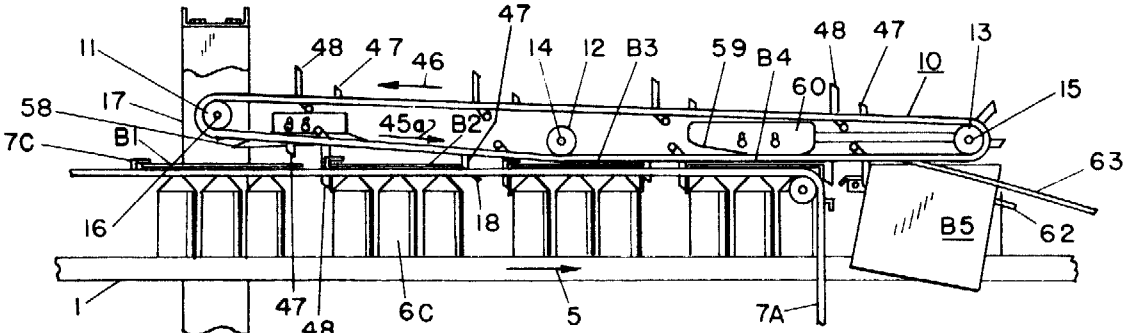
Figure 8:
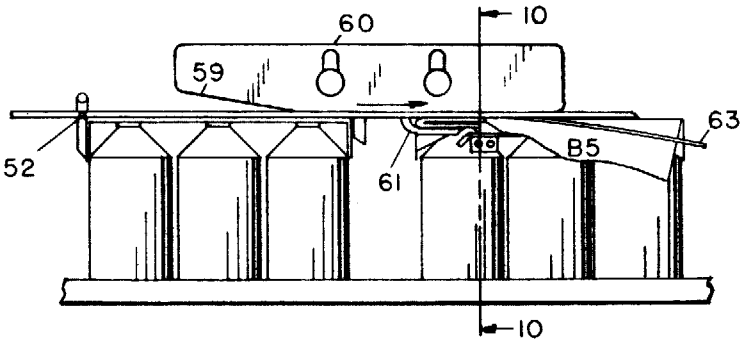
Figure 10:
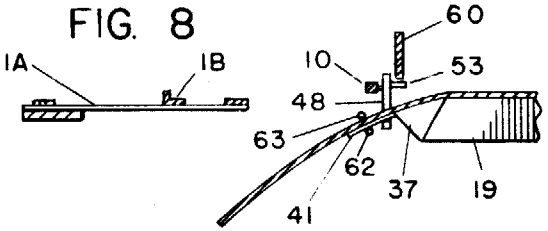
Figure 12:
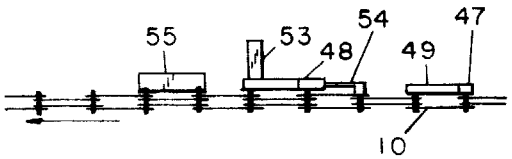
Figure 7:
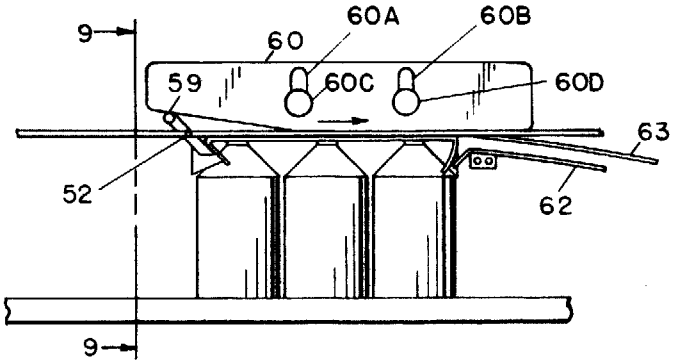
Figure 9:
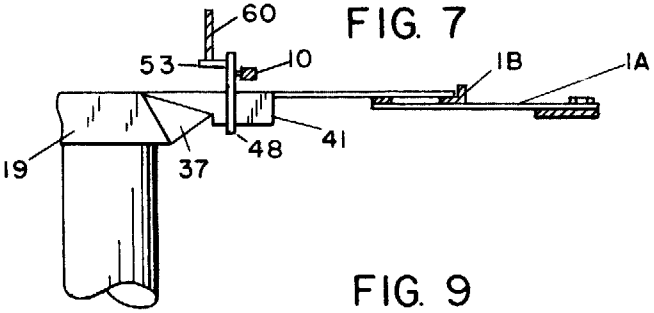
Figure 11:
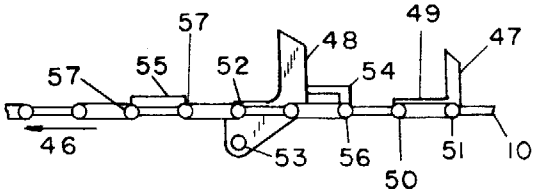

For a better understanding of the invention reference may be had to the following detailed description taken in conjunction with the accompanying drawings in which FIG. 1 is an elevation view taken from the side of the machine and which in schematic fashion shows the essential elements of a high speed machine of the type to which the invention is applicable; FIG. 2 is a plan view of a blank from which the carton having an end panel is formed and to which this invention is especially adapted; FIG. 3 is an elevational side view of a set-up carton formed from the blank depicted in FIG. 2; FIG. 4 is an end view of a set-up carton of the type depicted in FIGS. 2 and 3; FIG. 5 is a plan view of that portion of the machine depicted in FIG. 1 to which this invention is especially applicable; FIG. 6 is an elevation view of the structure depicted in FIG. 5; FIG. 7 is an enlarged view of a portion of the structure depicted in FIG. 6 and showing a particular package group at an intermediate stage of folding of the trailing end panel and depicting the approximate completion of the folding of the leading end panel; FIG. 8 is a view similar to FIG. 7 and showing two adjacent package groups in which the leading end panel has been folded to its vertical position and one of which shows the trailing end panel at an initial phase of folding and the other of which shows the trailing end panel after its folding operation is completed; FIG. 9 is a cross-sectional view taken along the line 9—9 as indicated in FIG. 7; FIG. 10 is a cross-sectional view taken approximately along the line designated 10—10 in FIG. 8; FIG. 11 is an enlarged fragmentary view of a portion of the tucking conveyor and depicting a tucking stud and a tucking pawl mounted thereon; and in which FIG. 12 is a top view of the structure depicted in FIG. 11.

With reference to FIGS. 1, 5 and 6, the numeral 1 generally designates the frame of the machine. A schematically represented hopper 2 is mounted on the frame 1 and a plurality of wrapper blanks generally designated by the numeral 3 are stacked on the hopper 2. Suitable means are provided for withdrawing the blanks from the hopper 3 such for example as the means disclosed in U.S. Patent 2,817,520, issued December 24, 1957, on an application filed by Hermond G. Gentry and owned by the assignee of this invention.

Articles to be packaged such as the bottles schematically depicted generally by the numeral 4 are fed in from the left and travel toward the right as indicated by the arrow 5. Preferably the articles are separated into groups of two rows of three bottles each by suitable means and a wrapper for each group is applied such as is disclosed in U.S. Patent 2,786,572, issued March 26, 1957, on an application filed by Hermond G. Gentry and owned by the assignee of this invention. These wrappers are formed about each package group in a manner such as is disclosed and claimed for example in U.S. Patent 2,751,-730, issued June 26, 1956, on an application also filed by Hermond G. Gentry and owned by the assignee of this invention. The completed packages are designated in FIG. 1 by the numeral 6. The numeral 6A in FIG. 1 designates a package in which a wrapper blank is but partially folded about a particular package group while the designation 6B designates a package and wrapper blank at a subsequent stage of the package forming operation. As is best shown in FIGS. 5 and 6, the blanks 3 are advanced toward the right on a pair of conveyor chains 7A and 7B on which are mounted push tabs 7C. The edges of the blanks ride on angles 1B affixed to brackets 1A on frame 1.

A horizontally disposed boom designated generally by the numeral 7 is provided to which side guide bars 8 are adjustably mounted by bolts 9.

The structure of this invention is depicted generally in FIG. 1 and comprises an endless tucking conveyor designated by the numeral 10 which is driven by a driving sprocket 11 and which is supported by a pair of idler sprockets 12 and 13. Idler sprockets 12 and 13 are affixed to shafts 14 and 15 which in turn are supported on frame elements not shown in FIG. 1. Sprocket 11 is mounted on a driving shaft designated by the numeral 16 which in turn is supported on upright elements 17 affixed to the frame 1. Generally speaking, suitable tucking studs and tucking pawls are mounted on tucking conveyor 10 and engage carton tucker panels associated with the end panels designated by the numerals 18 and 19 in FIG. 2 and force those panels downwardly into substantially vertical relation at the ends of each package group.

With regard to the structure of the carton to which the machine and method of this invention are especially adapted, reference should be had to FIGS. 2, 3 and 4. From these figures it is apparent that the end panels 18 and 19 are foldably joined respectively along fold lines 20 and 21 to a top panel 22. Furthermore, it will be observed that sloping top panels 23 and 24 are foldably joined along fold lines 25 and 26, respectively, to top panel 22. One side panel 27 is foldably joined along the fold line 28 to sloping top panel 23 and a similar side panel 29 is foldably joined along the fold line 30 to sloping top panel 24. Bottom lap panel 31 is foldably joined along the fold line 32 to the side panel 27 while a similar lap panel 33 is foldably joined along a fold line 34 to the side panel 29. As is explained and claimed in the above mentioned Patent 2,786,572 suitable locking and tightening means are provided in the lap panels 31 and 33 and these means are utilized to secure the blank shown in FIG. 2 about a package group as depicted generally in FIGS. 3 and 4.

The end panels 18 and 19 are interrelated with the sloping panels 23 and 24 by suitable web structure designated generally in the drawings by the numerals 35, 36, 37 and 38. In addition, each side wall is foldably joined along its ends to a tucker panel designated in the drawings by the numerals 39, 40, 41 and 42. Since all of the tucker panels are interrelated with their end panels along fold lines and since they are all related with their adjacent web panels along fold lines, it is deemed unnecessary to describe each tucker panel and its web structure in detail.

With reference to web structure 35, end panel 18, and tucker panel 39, it will be understood that the web 35 is foldably joined to tucker panel 39 along fold line 43 and that the web structure 35 is foldably joined to end panel 18 along the fold line 44. In addition, the web 35 is provided with a medial fold line along which it is collapsible, such line being designated by the numeral 45. The operations through which the structure of FIGS. 2, 3 and 4 is manipulated according to the invention will be described in detail hereinafter. Suffice it to say here that when the carton is completely formed as depicted in FIGS. 3 and 4, the end panels 18 and 19 are disposed in a vertical relation and the tucker panel 40 is disposed flat along side the side panel 27 while the tucker panel 41 is disposed flat against the inside surface of the side panel 29. Web structures 36 and 37 are collapsed and disposed adjacent the sloping top panels 23 and 24, respectively. Of course, it will be understood that the end panel 18 is also vertical and that the tucker panels and web structure at that end of the carrier blank are arranged in a manner identical to the arrangement of the end panel 19 and associated panels as already described.

According to the present invention, the machine and method illustrated in FIGS. 5 through 12, inclusive, are utilized to cause the end panels 18 and 19 of the carton shown in FIGS. 2–4 to assume the vertical position while the wrapper is being formed in a manner such as is disclosed and claimed in the aforementioned Patent 2,751,730. In FIG. 6 the lower portion of the tucking conveyor 10 moves toward the right as indicated by the arrow 45a and such lower portion is referred to herein as the tucking reach of tucking conveyor 10. Similarly, the upper portion of tucking conveyor 10 moves toward the left as indicated by the arrow 46 and such portion is designated herein as the return reach of the tucking conveyor. Of course, motion of the packages or article groups is toward the right as indicated by the arrow 5 in FIG. 6. In FIG. 6 five blanks are depicted and are designated in the drawings as B1, B2, B3, B4 and B5. Also as depicted in FIGS. 5 and 6, the tucking conveyor 10 is provided with a plurality of tucking studs designated by the numeral 47 as well as a plurality of tucking pawls designated by the numeral 48. As can best be seen in FIGS. 11 and 12, tucking studs 47 are securely affixed to the tucking conveyor 10 by virtue of the fact that each tucking stud is formed integrally with a base plate 49 which is affixed by the pins 50 and 51 as an integral part of the tucking conveyor 10. Likewise, the tucking pawls 48 are pivotably mounted on pins 52 which form an integral part of tucking conveyor 10. From FIGS. 11 and 12 it is apparent that the tucking paws 48 are provided with cam followers 53 and with abutment stops 54 and 55, these abutments 54 and 55 being securely affixed by pins 56 and 57 to the tucking conveyor 10. From the description thus far it will be apparent that each tucking pawl 48 may swing in a counterclockwise direction about its pivot 52 until it engages the abutment 55 and that it may swing approximately 90° away from engagement with the abutment 55 into engagement with the abutment stop 54. Movement of tucking pawls 48 is controlled by suitable cam means which engages the cam follower 53 as will be explained.

With reference again to FIGS. 5 and 6, the blank of FIG. 2 is arranged transverse to the bottle groups 6 in such a way that the end panel 18 is toward the right and hence constitutes the leading end panel and the end panel 19 is toward the left and hence constitutes the trailing end panel. With reference to FIG. 6, it is apparent that blank B1 is not engaged by the tucking stud 47 or the tucking pawl 48. When the blank moves to the position designated as B2, however, the tucking stud 47 has engaged tucker panel 42 and has moved that panel downwardly into an angular relation to the top panel 22. This downward movement is accomplished according to the invention due to the fact that the tucking reach of the conveyor 10 travels in a converging path toward the path of horizontal movement of the package groups. Thus, as the operation progresses each tucking stud 47 approaches closer and closer and finally folds the leading end panel 18 of the associated carton and package group into the vertical position. As depicted in FIG. 6 the leading end panel 18 is disposed vertically in the blanks B3, B4, and B5.

Simultaneously, the tucking pawl is manipulated in a suitable fashion according to the invention and like tucking stud 47 initiates a downward pressure on trailing tucker panel 41 tending to fold the trailing end panel 19 into the vertical position when the carton blank occupies the positions B2, B3, B4 and B5. As each tucking stud passes under sprocket 11 it tends to swing counterclockwise about its pivot 52 due to its weight distribution. In order to cause the pawls to assume a vertical position a cam 58 is provided for engagement by cam followers 53. As each cam follower 53 rides up and over cam 59, the tucking pawl swings clockwise due to cam 58 until the pawl is in the vertical position. In the position depicted between B4 and B5, however, the cam follower 53 engages a sloping cam surface 59 of the cam 60 and rotates the tucking pawl to the position designated at 61 in FIG. 8. Such operation is necessary, of course, due to the fact that the wrapper and its bottle group are in effect "going away" toward the right and hence the pawl must compensate by swinging inwardly as depicted at 61 in FIG. 8.

To render the machine adjustable to accommodate packages of different sizes, the cam 60 is adjustably mounted by slots 60A and 60B and bolts 60C and 60D to boom 7.

Of course, the tucking stud and tucking pawl cannot force the associated tucker panels of the carton into the final positions they will occupy as depicted in FIGS. 3 and 4 until the side walls of the carton designated by the numerals 27 and 29 are folded to the vertical position.

Thus, as is best shown in FIGS. 7 and 10 an inside guide 62 engages the tucker panels 40 and 41 while an outside guide 63 rides along the outer surface of the side wall panels 27 and 29. Thus, while outside guide 63 sweeps the associated carton side wall downwardly the inside guide brushes the tucker panels on the trailing edge of the carton blank into snug engagement with the associated carton side wall. Once this operation is completed the carton is formed with its end panel as depicted in FIG. 4. In FIG. 6 the guides 62 and 63 are shown somewhat to the right of their actual positions for clarity. Actually these guides would necessarily have to be mounted as shown in FIGS. 7 and 8 under the cam 60 so as to begin to function before the pawls are released by cam 60.

For the purpose of properly and positively positioning the carton side walls and in order to prevent the carton side walls from trailing behind the articles to be packaged a folding element 15C is affixed to and rotatable with the sprocket 15A driven by chain 15B.

After the end panel is moved into the vertical position the lap panels 31 and 33 are fastened together, for example as described in the above mentioned Patent 2,751,730.

From the aforementioned description it is apparent that the carton formed from the blank depicted in FIG. 2 affords advertising space in the form of end panels 18 and 19. Furthermore, it will be understood that the end panels 18 and 19 afford additional article retaining means which can hold the packaged articles securely within the wrapper even though the primary packages may be characterized by low mechanical strength. Furthermore, it is apparent that these purposes have been accomplished without materially diminishing the speed or general proficiency of a machine such as is disclosed in U.S. Patent 2,751,730.

While we have shown and described a particular machine and method we do not wish to be limited thereto and intend in the appended claims to cover all such changes and modifications as fall within the true spirit and scope of the invention.

What we claim as new and desire to secure by Letters Patent of the United States is:

1. A machine for packaging a plurality of articles in a wrap-around type wrapper, said machine comprising means for advancing a group of articles along a predetermined path, means for advancing a wrapper blank along said path and immediately above a group of articles to be packaged, a tucking conveyor having a tucking reach disposed immediately above and in downwardly converging relation to said predetermined path, and a tucking stud mounted on said conveyor and arranged to engage a part of the wrapper along the leading edge thereof, said tucking stud being effective to fold said part of the wrapper downwardly and generally toward the articles below the wrapper.

2. A machine for packaging a plurality of articles in a wrap-around type wrapper, said machine comprising means for advancing a group of articles along a predetermined path, means for advancing a wrapper blank along said path and immediately above a group of articles to be packaged, a tucking conveyor having a tucking reach disposed immediately above said predetermined path, a tucking pawl pivotally mounted on said conveyor and pivotally movable between a pair of abutment elements on said conveyor, and a fixed cam disposed for engagement by said pawl and effective to swing said pawl about its pivotal mounting and toward a part of the wrapper along the trailing edge thereof, said pawl being effective to fold said part of the wrapper downwardly and in the general direction of movement of the wrapper and of the articles below the wrapper.

3. A machine for packaging a plurality of articles in a wrap-around type wrapper, said machine comprising means for advancing a group of articles along a predetermined path, means for advancing a wrapper blank along said path and immediately above a group of articles to be packaged, a tucking conveyor having a tucking reach disposed immediately above and in downwardly converging relation to said predetermined path, a tucking stud mounted on said conveyor and arranged to engage a part of the wrapper along the leading edge thereof, said tucking stud being effective to fold said part of the wrapper downwardly and generally toward the articles below the wrapper, a tucking pawl pivotally mounted on said conveyor and pivotally movable between a pair of abutment elements on said conveyor, and a fixed cam disposed for engagement by said pawl effective to swing said pawl about its pivotal mounting and toward a part of the wrapper along the trailing edge thereof, said pawl being effective to fold said part of the wrapper downwardly and in the general direction of movement of the wrapper and of the articles below the wrapper.

4. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsible web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, and leading end panel folding means movable in substantial synchronism with the blank and its associated package group along a path of travel which is disposed in converging relation to the predetermined path of movement of the blank and its associated group of articles so as to engage the tucker panels on the leading edge of the blank and to fold such tucker panels in a direction tending to fold the leading end panel toward the group of articles.

5. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsible web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, leading end panel folding means movable in substantial synchronism with the blank and its associated package group along a path of travel which is disposed in converging relation to the predetermined path of movement of the blank and its associated group of articles so as to engage the tucker panels on the leading edge of the blank and to fold such tucker panels in a direction tending to fold the leading end panel toward the group of articles, trailing end panel folding means movable in substantial synchronism with the blank and its associated package group and normally occupying a predetermined positional relation thereto, and means effecting a change in the positional relation of said trailing end panel folding means relative to the blank and its associated package group so as to effect folding of the trailing tucker panels and end panel in a direction toward the associated article group.

6. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsible web structure interconnecting each tucker panel and a different end of one of the end panels, said machine comprising means for advancing the blank along a predetermined path in conjunction with a group of articles to be packaged therein, the blank being disposed with one end panel and its associated tucker panels in a leading relation to the group of articles and with the other end panel and its associated tucker panels in a trailing relation thereto, leading end panel folding means movable in substantial synchronism with the blank and its associated package group along a path of travel which is disposed in converging relation to the predetermined path of movement of the blank and its associated group of articles so as to engage the tucker panels on the leading edge of the blank and to fold such tucker panels in a direction tending to fold the leading end panel toward the group of articles, movably mounted pawl means movable in substantial synchronism with the blank and its associated package group and normally occupying a predetermined positional relation to the tucker panels on the trailing edge of the blank, and cam means engageable by said pawl means for moving said pawl means bodily out of its normal positional relation to said tucker panels and into engagement therewith thereby to impart movement to the trailing end panel in a direction toward the associated package group.

7. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsible web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, leading end panel folding means movable in substantial synchronism with the blank and its associated package group along a path of travel which is disposed in converging relation to the predetermined path of movement of the blank and its associated group of articles so as to engage the tucker panels on the leading edge of the blank and to fold such tucker panels in a direction tending to fold the leading end panel toward the group of articles, movably mounted pawl means movable in substantial synchronism with the blank and its associated package group and normally occupying a predetermined positional relation to the tucker panels on the trailing edge of the blank, cam means engageable by said pawl means for moving said pawl means bodily out of its normal positional relation to said tucker panels and into engagement therewith thereby to impart movement to the trailing end panel in a direction toward the associated package group, and inside guide means engageable by said trailing tucker panels for retaining said trailing tucker panels adjacent their associated side panels.

8. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsibly web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, leading end panel folding means movable in substantial synchronism with the blank and its associated package group along a path of travel which is disposed in converging relation to the predetermined path of movement of the blank and its associated group of articles so as to engage the tucker panels on the leading edge of the blank and to fold such tucker panels in a direction tending to fold the leading end panel toward the group of articles, movably mounted pawl means movable in substantial synchronism with the blank and its associated package group and normally occupying a predetermined positional relation to the tucker panels on the trailing edge of the blank, cam means engageable by said pawl means for moving said pawl means bodily out of its normal positional relation to said tucker panels and into engagement therewith thereby to impart movement to the trailing end panel in a direction toward the associated package group, inside guide means engageable by said trailing tucker panels for retaining said trailing tucker panels adjacent their associated side panels, and outside guide means engageable by the outside surfaces of the blank side walls for imparting movement to said side walls in a direction toward the associated package group.

9. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsible web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, an endless tucking conveyor having a tucking reach disposed in converging relation to the path of movement of the blank and its associated article group, a tucking stud mounted on said conveyor and engageable with one of said tucker panels on the leading edge of the blank due to its converging path of movement and effective to fold said tucker panel out of the plane of its associated side panel and toward the package group, a tucking pawl pivotally mounted on said conveyor and spaced from said tucking stud by a distance corresponding generally to the length of the top and side panels of the blank, and a fixed cam engageable by said tucking pawl for rotating said pawl bodily about its pivotal mounting thereby to cause said pawl to engage one of the said tucker panels on the trailing edge of the blank and to effect folding of said tucker panel out of the plane of its associated side wall and in the general direction of the associated package group.

10. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respecitvely and including a collapsible web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, an endless tucking conveyor having a tucking reach disposed in converging parallel relation to the path of movement of the blank and its associated article group, a tucking stud mounted on said conveyor and engageable with one of said tucker panels on the leading edge of the blank due to its converging path of movement and effective to fold said tucker panel out of the plane of its associated side panel and generally toward the package group, a tucking pawl pivotally mounted on said conveyor and spaced from said tucking stud by a distance corresponding generally to the length of the top and side panels of the blank, a fixed cam engageable by said tucking pawl for rotating said pawl bodily about its pivotal mounting thereby to cause said pawl to engage one of said tucker panels on the trailing edge of the blank and to effect folding of said tucker panel out of the plane of its associated side wall and in the general direction of the associated package group, and a fixed inside guide disposed for engagement by the trailing tucker flap following the initial folding thereof by said tucking pawl, said inside guide being configured to continue folding the trailing tucker flap toward its associated blank side wall.

11. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsible web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, an endless tucking conveyor having a tucking reach disposed in converging parallel relation to the path of movement of the blank and its associated article group, a tucking stud mounted on said conveyor and engageable with one of said tucker panels on the leading edge of the blank due to its converging path of movement and effective to fold said tucker panel out of the plane of its associated side panel and generally toward the package group, a tucking pawl pivotally mounted on said conveyor and spaced from said tucking stud by a distance corresponding generally to the length of the top and side panels of the blank, a fixed cam engageable by said tucking pawl for rotating said pawl bodily about its pivotal mounting thereby to cause said pawl to engage one of said tucker panels on the trailing edge of the blank and to effect folding of said tucker panel out of the plane of its associated side wall and in a direction generally toward the associated package group, a fixed inside guide disposed for engagement by the trailing tucker flap following the initial folding thereof by said tucking pawl, said inside guide being configured to continue folding the trailing tucker flap toward its associated blank side wall, and a fixed outside guide disposed for engagement by the outside surface of said side wall of the blank, said outside guide being configured to impart movement of said side wall toward the package group and simultaneously to effect at least a partial collapse of the web structure interconnecting said leading and trailing tucker panels and the adjacent ends of end panels.

12. A machine for packaging a plurality of similarly shaped articles in a wrap-around type of blank having a top panel to the ends of which a pair of end panels are foldably joined respectively and having a pair of side walls to the ends of each of which a pair of tucker panels are foldably joined respectively and including a collapsible web structure interconnecting each tucker panel and a different end of one of the end panels, said machine comprising means for advancing the blank along a predetermined path in conjunction with a group of articles to be packaged therein, the blank being disposed with one end panel in a leading relation to the group of articles and with the other end panel in a trailing relation thereto, an endless tucking conveyor having a tucking reach disposed in downwardly converging relation to the path of movement of the blank and its associated article group, a tucking stud mounted on said conveyor and engageable with one of said tucker panels on the leading edge of the blank due to its converging path of movement and effective to fold said tucker panel out of the plane of its associated side panel and generally toward the package group, a tucking pawl pivotally mounted on said conveyor and spaced from said tucking stud by a distance corresponding generally to the length of the top and side panels of the blank, a fixed cam engageable by said tucking pawl for rotating said pawl bodily about its pivotal mounting thereby to cause said pawl to engage one of said tucker panels on the trailing edge of the blank and to effect folding of said tucker panel out of the plane of its associated side wall and in a direction generally toward the associated package group, and a fixed outside guide disposed for engagement by the outside surface of the side wall of the blank, said outside guide being configured to impart movement of said side wall toward the package group and simultaneously to effect at least a partial collapse of the web structure interconnecting said leading and trailing tucker panels and the adjacent ends of said end panels.

13. A method of forming a package for a plurality of articles comprising arranging the articles in a group, moving the group along a predetermined path, placing a wrapper type blank in transverse relation to the path of movement of the group of articles and moving it in substantial synchronism therewith, folding parts of the blank along the leading and trailing edges thereof and on opposite sides of the group of articles in the general direction of the articles so as to cause intermediate parts of the blank along the leading and trailing edges thereof to swing toward the articles, and securing the ends of the blank together.

14. A method of forming a package for a plurality of articles comprising arranging the articles in a group, moving the group along a predetermined path, placing a wrapper type blank in transverse relation to the path of movement of the group of articles and moving it in substantial synchronism therewith, engaging and folding parts of the blank along the leading and trailing edges thereof and on opposite sides of the group of articles in the general direction of the articles so as to cause intermediate parts of the blank along the leading and trailing edges thereof to swing toward the articles, simultaneously folding the parts of the blank between the leading and trailing edges of the blank and on opposite sides of the articles in the general direction of the articles, and securing the ends of the blank together.

*15. A method of applying a carton having a top wall and an end identification panel to a group of containers comprising the steps of conveying both the carton and the group of containers in a direction along substantially parallel predetermined paths, applying the carton to the group of containers, and folding the end identification panel along a line substantially normal to the direction of the predetermined parallel paths.*

References Cited

The following references, cited by the Examiner, are of record in the patented file of this patent or the original patent.

UNITED STATES PATENTS

| | | | |
|---|---|---|---|
| 2,896,382 | 7/1959 | Back | 53—48 |
| 3,037,431 | 6/1962 | McGihon | 53—48 |

TRAVIS S. McGEHEE, Primary Examiner

U.S. Cl. X.R.

53—48, 209